United States Patent [19]

Noshi et al.

[11] 4,452,635

[45] Jun. 5, 1984

[54] HYDRAULIC CEMENT COMPOSITION

[75] Inventors: Yoshibumi Noshi, Sakura; Hiroyuki Naito, Tokyo; Kiyoshi Takai; Masaaki Sugawara, both of Tsuruoka, all of Japan

[73] Assignee: Mizusawa Industrial Chemicals Ltd., Osaka, Japan

[21] Appl. No.: 470,550

[22] Filed: Feb. 28, 1983

[30] Foreign Application Priority Data

Mar. 3, 1982 [JP] Japan .................................. 57-32277

[51] Int. Cl.³ .............................................. C04B 19/04
[52] U.S. Cl. ........................................ 106/74; 106/84
[58] Field of Search ..................................... 106/74, 84

[56] References Cited

U.S. PATENT DOCUMENTS 4,018,616  4/1977  Sugahara et al. ................... 106/74
4,169,735  10/1979 Boberski et al. ..................... 106/74

Primary Examiner—James Poer
Attorney, Agent, or Firm—Sherman & Shalloway

[57] ABSTRACT

Disclosed is a hydraulic cement composition comprising (A) a water-soluble alkali metal borosilicate or a combination of a water-soluble alkali metal silicate and an alkali metal borate soluble in an alkaline aqueous solution, (B) silicon polyphosphate, (C) an alkali metal silicofluoride and (D) substantially amorphous barium silicate in which the $BaO/SiO_2$ molar ratio is in the range of from 1/2.5 to 1/6.

11 Claims, No Drawings

HYDRAULIC CEMENT COMPOSITION

BACKGROUND OF THE INVENTION

(1) Field of Invention

The present invention relates to a hydraulic cement composition. More particularly, the present invention relates to a hydraulic cement composition which shows a markedly excellent fluidity with a small normal consistency and also shows excellent water impermeability, fire resistance, strength and weatherability after hardening and which is very valuable as a binder, sealant or solidifying agent for various materials and also as a molding material.

(2) Description of the Prior Art

Hydraulic cements such as Portland cement have been widely used as the cement composition. However, a normal consistency of 26 to 35% is necessary for imparting a sufficient hardenability to these known cement compositions. It is known that the mechanical strength or denseness of a hydraulic cement is greatly influenced by the normal consistency, and since conventionl Portland cement has a relatively large normal consistency, a hardened product thereof is relatively poor in the flexural strength and the like and its water permeability is relatively high. Moreover, a known unhardened aqueous composition of Portland cement is poor in the fluidity though the normal consistency is large, and it is difficult to fill this composition in fine voids or the like.

Recently, there is adopted a method in which a concentrated waste liquid discharged from the vicinity of a nuclear reactor or an ion exchange resin used for the treatment of this waste liquid is dried and is packed in a vessel in the state solidified by a solidifying agent and the sealed vessel is stored or discarded. The solidifying agent to be used in this method should satisfy various requirements. First of all, since this solidifying agent is exposed to radioactive rays, it should have such a property that it is not substantially deteriorated by radioactive rays. From this viewpoint, use of an inorganic solidifying agent is preferred. Furthermore, this solidifying agent should be excellent in the resistance to permeation of water, the mechanical strength and the weatherability. Moreover, the solidifying agent should have such a long pot life that the filling operation or the like can be performed conveniently, and the solidifying agent should have such a fluidity that the solidifying agent can uniformly flow in the vessel and can be uniformly filled in any part of the vessel. Still further, it is important that the volume of the waste per unit volume of the vessel, that is, the volume reduction ratio, should be increased. For this purpose, the solidifying agent should be used in an amount as small as possible.

SUMMARY OF THE INVENTION

It is therefore a primary object of the present invention to provide a cement composition which can be hardened with a relatively small normal consistency, is excellent in the fluidity in the unhardened state in spite of a small normal consistency and has a long pot life in this unhardened state and which gives a hardened product which is markedly excellent in the water impermeability, mechanical strength, weatherability and water resistance.

Another object of the present invention is to provide a cement composition which is valuable as an aqueous inorganic binder for bonding, adhesion and solidification of various materials and for the production of solidified structures.

Still another object of the present invention is to provide a cement composition which can satisfy all of the above-mentioned requirements to be satisfied by a solidifying agent for radioactive wastes and which can effectively be used as such solidifying agent.

In accordance with the present invention, there is provided a hydraulic cement composition comprising (A) a water-soluble alkali metal borosilicate or a combination of a water-soluble alkali metal silicate and an alkali metal borate soluble in an alkaline aqueous solution, (B) silicon polyphosphate, (C) an alkali metal silicofluoride and (D) substantially amorphous barium silicate in which the $BaO/SiO_2$ molar ratio is in the range of from 1/2.5 to 1/6.

DETAILED DESCRIPTION OF THE INVENTION

The cement composition of the present invention comprises as indispensable components the above-mentioned four components (A) through (D), and in connection with the chemical composition, the cement composition of the present invention is prominently characterized in that all of these indispensable components are silicate- or silicon-containing compounds. Among these indispensable components, the alkali metal borosilicate or the like as the component (A) acts as the main binder, the silicon polyphosphate as the component (B) acts as the hardening agent, and the alkali metal silicofluoride as the component (C) acts as the hardening assistant. Barium silicate as the component (D) acts as the filling stabilizer in a sense.

The present invention is based on the novel finding that when an alkali metal silicofluoride and amorphous barium silicate are added to a hardenable composition comprising the above-mentioned alkali metal borosilicate binder and silicon polyphosphate hardening agent, hardening of the composition can be accomplished with a much smaller normal consistency than the normal consistency for the conventional hydraulic cements, and the fluidity of the aqueous composition in the unhardened state is highly improved and the denseness of the composition in the hardened state is highly improved, with the result that the resistance to permeation of water and the fire resistance are prominently improved.

The cement composition of the present invention is characteristic over the conventional hydraulic cements in that the cement composition of the present invention can be hardened with a much reduced normal consistency. More specifically, the composition of the present invention shows a self-hardening property with a water amount of 15 to 30%, especially 18 to 28%, though this water amount differs to some extent according to the mixing ratios of the respective components. Accordingly, the normal consistency of the cement composition of the present invention is much smaller than the normal consistency of Portland cement, that is, 26 to 35%, or the normal consistency of gypsum plaster, that is, 29 to 38%. The normal consistency has a close relation to the denseness of the obtained hardened product, and according to the present invention, a denser hardened product can be obtained.

The cement composition of the present invention is advantageous in that the fluidity is very high even with this small normal consistency. Ordinarily, the fluidity of a hydraulic composition is expressed by the flow length of the composition after the lapse of a certain time from the point when the composition is applied to an inclined plate, that is, the flow value described hereinafter. A slurry of conventional Portland cement has already a flow value as small as 5 to 34 cm/min after the lapse of 5 minutes, and a slurry of an alkali metal borosilicate and silicon polyphosphate has a large flow value at the initial stage but the flow value is reduced several centimeters per minute after the lapse of 30 minutes. In contrast, the cement composition of the present invention has a flow value of 20 to 120 cm/min even after the lapse of 30 minutes in spite of the above-mentioned small normal consistency. Accordingly, it will readily be understood that the cement composition of the present invention is prominently excellent in the fluidity.

Since the cement composition of the present invention comprises the above-mentioned alkali metal silicofluoride and amorphous barium silicate and the normal consistency of the cement composition of the present invention is very small, the cement composition of the present invention is very excellent in the water impermeability. This is another advantage of the cement composition of the present invention. As described in detail hereinafter, the water permeability of the hardened product is determined based on the permeation thickness of colored water observed when the hardened product is immersed in colored water. The water permeability of a hardened product of conventional Portland cement is higher than 5 mm/30 days and the water permeability of a hardened product of alkali metal borosilicate/silicon polyphosphate is 5 to 20 mm/30 days. In contrast, the water permeability of a hardened product of the cement composition is lower than 3 mm/30 days. Accordingly, it will readily be understood that the cement composition of the present invention is prominently excellent in the water impermeability of the hardened product.

Furthermore, the cement composition of the present invention is excellent in the fire resistance. This is an advantage of the present invention, which is not attained in conventional hydraulic cement compositions of this type at all. Although a hardened product of known hydraulic cement is considerably firm and solid at room temperature, if the hardened product is exposed to such high temperatures as about 800° C. and is then allowed to stand still at room temperature, many cracks are formed and the structure of the hardened product becomes mechanically brittle. In contrast, if the hardened product of the cement composition of the present invention is exposed to such high temperatures and allowed to stand still at room temperature, no cracks are formed at all and excellent mechanical properties are retained. This is still another advantage of the present invention.

The hardened product of the cement composition of the present invention is prominently excellent in the mechanical strength. For example, the flexural strength of a hardened product of Portland cement is about 60 Kg/cm. In contrast, the flexural strength of the hardened product of the cement composition of the present invention is 120 Kg/cm or higher.

In the present invention, (i) a water-soluble alkali metal borosilicate or (ii) a combination of a water-soluble alkali metal silicate and an alkali metal borate soluble in an alkaline aqueous solution is used as the first component (A). In connection with the chemical composition, this component is characterized in that this component contains boric acid in addition to the conventional alkali metal silicate binder. Because of this characteristic, the component (A) of the present invention has such a property that a glutinous state is maintained even under strongly dehydrating conditions, though this property is not possessed by the conventional silicate binders at all. By dint of this characteristic property, when the first component (A) is combined with a hardening agent, it gives an excellent binding property and an appropriate pot life to the resulting cement composition, and if this composition is used in the form of an aqueous dispersion, premature gelation or partial gelation is not caused at all and a good fluidity is maintained.

The silicon polyphosphate used as the second component (B) is a compound having a structure in which silica is bonded in the form of a cation to the condensed phosphoric acid. Among various phosphates, this compound is especially excellent in the property of gradually releasing phosphate radicals (see the specification of U.S. Pat. No. 4,018,616). When this compound is used as the hardening agent in combination with the first component (A), an excellent hardening action can be exerted without impairment of the above-mentioned disadvantages.

One of important features of the present invention is that an alkali metal silicofluoride and amorphous barium silicate are used as the third component (C) and fourth component (D), respectively, in addition to the above-mentioned borosilicate binder and silicon polyphosphate hardening agent. A composition comprising the borosilicate binder and silicon polyphosphate has an excellent binding or hardening action and an appropriate pot life in combination, and when this composition is used in the form of an aqueous dispersion, premature gelation or partial gelation is prevented and a high fluidity state is maintained for a relatively long time. However, this composition still has demerits to be obviated, either in the unhardened state or in the hardened state.

When this two-component type composition is mixed with water, the mixture shows a good fluidity in the initial stage, but after the lapse of about 30 minutes, the fluidity is drastically reduced. A hardened product comprising the two components (A) and (B) has higher flexural strength and crushing strength than those of a hardened product of Portland cement or the like for a certain time after the production. However, if this hardened product is subjected to the running water immersion test and outdoor exposure test, there is observed a tendency that the strength is reduced to a very low level. Furthermore, when this hardened product is allowed to stand still under a high humidity condition, bleeding of water-soluble salts on the surface of the hardened product is caused, resulting in deformation or formation of cracks. It is considered that this undesirable phenomenon is due to dissolving-out of the silicate component in the form of sodium metasilicate, which is caused when the hardened molded article is subjected to the running water immersing test, exposed to rain during the outdoor exposure or placed under a high humidity condition. Further, when the hardened product is subjected to the outdoor exposure test, powdering of the surface portion of the hardened product is likely to be caused and a so-called efflorescence phenomenon of bleeding of water-soluble salts contained in the hardened product to the surface of the hardened product is simultaneously caused, with the result that the hardened product is reduced to a skeleton and the texture becomes brittle. Moreover, even if the hardened product per se has a water resistance, the texture of the hardened product is relatively porous and the hardened product has such a property that the interior of the hardened porduct allows passage of water, that is, the hardened product has a water permeability.

The alkali metal silicofluoride used in the present invention is known as a hardening agent for an alkali metal silicate binder. In the present invention, the alkali metal silicofluoride is used as the hardening assistant in combination with the silicon polyphosphate hardening agent so as to improve the fluidity of the unhardened aqueous composition. More specifically, when the combination of the alkali metal silicofluoride and silicon polyphosphate is used as the hardening agent, not only shortly after admixing with water but also after the passage of a considerable time from the point of admixing with water, the flidity can be maintained at a very high level, and the adaptability to various operations is remarkably improved. Furthermore, the alkali metal silicofluoride exerts a function in prominently controlling the water permeability together with amorphous barium silicate described hereinafter. Moreover, when the alkali metal silicofluoride is used, by the synergistic action with silicon polyphosphate, dissolving-out of sodium metasilicate from the hardened molded product and the efflorescence phenomenon are controlled and the weatherability, water resistance and mechanical strength are prominently improved.

Amorphous barium silicate used in the present invention exerts functions in improving the denseness of the hardened product, prominently controlling the water permeability and stabilizing the actions of the silicon polyphosphate and alkali metal silicofluoride. In the case where sodium metasilicate is precipitated and present in the hardened product or silicon polyphosphate is left in the hardened product, reduction of the water resistance of the hardened product is observed. The amorphous barium silicate used in the present invention prevents precipitation of sodium metasilicate and finally reacts with silicon polyphosphate left in the hardened product to assist the improvement of the water resistance.

In the present invention, it is preferred that an alkali metal silicate powder and an alkali metal borate powder be used in combination as the first component (A). If this combination is used, all the components can be charged in the powdery state in one package, and it is sufficient if a predetermined amount of water is added to form a paste just before the application. Accordingly, weighing or mixing of the respective components is not necessary at the time of the application. This is still another advantage attained by the present invention.

The powdery alkali metal silicate used in the present invention is water-soluble or water-dispersible, and it is preferred that the $M_2O/SiO_2$ molar ratio (M stands for an alkali metal) be in the range of from 1/1.3 to 1/3.2. If the molar ratio is outside the above-mentioned range, when the composition is used as the binder, the adhesion strength is likely to be reduced. Sodium silicate is preferred for attaining the objects of the present invention, but potassium silicate can also be used in the present invention. The alkali metal silicate may contain water of dydration, so far as the alkali metal silicate is powdery.

An optional alkali metal borate can be used in the present invention, so far it is soluble in an alkaline solution. For example, sodium borate and potassium borate are preferably used. The borate may be an anhydrous salt or a salt hydrate such as a trihydrate, a pentahydrate, a heptahydrate or a decahydrate.

It is preferred that the alkali metal silicate and alkali metal borate be combined so that the molar ratio of $B_2O_3$ in the alkali metal borate to $SiO_2$ in the alkali metal silicate is in the range of 1/0.03 to 1/0.3, especially 1/0.05 to 1/0.25.

The alkali metal silicate and alkali metal borate may be used in the form of a solution of an alkali metal borosilicate instead of a powdery mixture. This aqueous solution can be obtained by dissolving the above-mentioned two salts and, if desired, effecting reaction under heating.

If the molar ratio of the borate component ($B_2O_3$) is too low and below the above-mentioned range, the water resistance is reduced and also the stability is reduced. If this molar ratio is too high and beyond the above-mentioned range, no particular advantage can be attained but the composition becomes economically disadvantageous.

The silicon polyphosphate used in the present invention comprises as the indispensable ingredients the phosphoric acid and silicic acid components, and this phosphoric acid component is contained in the condensed form. It is preferred that the $P_2O_5/SiO_2$ molar ratio in the silicon polyphosphate be in the range of from 1/1.8 to 1/3.6, especially from 1/2.0 to 1/3.3. If the molar ratio of the phosphoric acid component ($P_2O_3$) is too low and below the above-mentioned range, the desired hardening property cannot be obtained, and the mechanical strength is likely to be reduced. If this molar ratio is too high and beyond the above-mentioned range, when the composition is formed into an aqueous dispersion, premature gelation or partial gelation is readily caused.

In order to prevent premature gelation or partial gelation and harden the alkali metal borosilicate uniformly and solidly, it is important that this silicon polyphosphate should have a property of gradually releasing phosphoric acid. In this connection, it is preferred that the initial dissolution amount B, defined by the following formula, of the silicon polyphosphate be smaller than 250, especially smaller than 200, and the average hydrolysis speed constant A, defined by the following formula, of the silicon polyphosphate be at least 0.2, especially in the range of from 0.3 to 13:

$$Y = AX + B$$

wherein X stands for the elapsed time (minutes), up to 120 minutes, of a sample solution of 1 g of the hardening agent in 100 ml of a 4 N aqueous solution of sodium hydroxide from the point of preparation of the sample solution, and Y stands for the ingerated amount (mg/100 ml) of phosphoric acid ($P_2O_5$) dissolved out into the sample solution. The process for the preparation of this gradually releasing phosphate type hardening agent and properties of this hardening agent are described in detail in the specification of U.S. Pat. No. 4,018,616.

In the present invention, for example, sodium silicofluoride ($Na_2SiF_6$) and potassium silicofluoride ($K_2SiF_6$) are used as the alkali metal silicofluoride. The alkali metal silicofluoride is ordinarily used in the form of fine powder, especially powder having a particle size smaller than 60 microns. From the viewpoint of improving the fluidity, it is important that this silicofluoride should be in the form of an alkali metal salt. When an alkaline earth metal salt, for example, barium silicofluoride, is used, the fluidity is drastically reduced when the composition is formed into an aqueous slurry.

The barium silicate used in the present invention is characterized in that the $BaO/SiO_2$ molar ratio is in the range of from 1/2.5 to 1/6 and the barium content is lower than in ordinary barium silicates such as an ortho-salt ($Ba_2SiO_4$), a meta-salt ($BaSiO_3$) and a meso-salt ($BaSi_2O_5$), and that it is amorphous. If the barium content in the barium silicate is too high and beyond the above range, the denseness of the hardened product tends to drastically decrease. In view of this fact, it is believed that the action of densifying the hardened product is based on a delicate balance between the acidity of the silicic acid component and the basicity of the barium component. When crystalline barium silicate is used, no substantial effect of densifying the hardened product can be expected. In view of this fact, it is believed that the reactivity of barium silicate has a close relation to the above-mentioned action of densifying the hardened product.

It is preferred that when the barium silicate used in the present invention is formed into a 5% by weight aqueous dispersion, the pH value of the aqueous suspension be 9 to 13 and that the particle size distribution be such that particles having a size smaller than $10\mu$ occupy 10 to 50% by weight of the total particles and particles having a size larger than $20\mu$ occupy 50 to 90% by weight of the total particles. If the pH value of the suspension is too high, dispersing in an aqueous medium becomes insufficient, and if the pH value of the suspension is too low, the water permeability of the hardened product tends to decrease. If the content of finer particles in the barium silicate is too high and beyond the above-mentioned range, the fluidity is drastically reduced and also the resistant to water permeation is degraded in the hardened product. If the content of coarser particles is too large and beyond the above-mentioned range, the denseness of the hardened product is degraded and the effect of stabilizing the action of the composite hardening agent is likely to be lost.

This barium silicate is prepared by mixing a relatively active silicic acid component, such as amorphous silica in the form of a sol, hydrogel or xerogel, activated silica obtained by the acid treatment of a clay or a silica-containing material, e.g., a smectic clay, with a barium-containing material such as barium hydroxide or barium carbonate at the above-mentioned molar ratio, and calcining this mixture at a temperature of 700° to 900° C. Of course, the process for the preparation of the barium silicate used in the present invention is not limited to the above-mentioned process.

In the present invention, it is preferred that 100 parts by weight, as solids, of the binder component (A) such as an alkali metal borosilicate be mixed with 7 to 75 parts by weight, especially 10 to 70 parts by weight, as solids, of silicon polyphosphate (B), 10 to 60 parts by weight, especially 20 to 60 parts by weight, as solids, of an alkali metal silicofluoride and 10 to 80 parts by weight, especially 15 to 40 parts by weight, as solids, of amorphous barium silicate.

If the amount of the silicon polyphosphate is too large and beyond the above-mentioned range, the fluidity of the aqueous composition to be hardened tends to be reduced, and if the amount of the silicon polyphosphate is too small and below the above-mentioned range, the composition is not easily solidified and the strength and water resistance of the hardened product are likely to be degraded. If the amount of the alkali metal silicofluoride is too small and beyond the above-mentioned range, the fluidity of the aqueous composition to be hardened is reduced, and if the amount of the alkali metal silicofluoride is too large and beyond the above-mentioned range, the resistance to permeation of water is reduced and the efflorescence phenomenon is likely to occur. If the amount of amorphous barium silicate is too small and below the above-mentioned range, the denseness of the hardened product is not improved to a desirable level and the resistance to permeation of water is degraded. If the amount of amorphous barium silicate is too large and beyond the above-mentioned range, the fluidity of the aqueous composition to be hardened is reduced and the fire resistance of the hardened product is reduced.

The hydraulic cement composition of the present invention may be applied to various uses in the form of a two-package type hardenable composition in which the hardening agent component and the binder component are separately packaged, or a one-package type hardenable composition in which all the components are mixed together.

From the viewpoint of the flow characteristics, it is preferred that powder of crystalline barium metasilicate (E) be incorporated in the hydraulic cement composition of the present invention. If crystalline barium metasilicate is incorporated, the fluidity of the aqueous slurry to be hardened is promonently improved, and for example, even when a granular waste is packed in a vessel and the aqueous slurry is then poured, the aqueous slurry permeates into all the fine spaces among the granules and a completely solidified product can be obtained. For this purpose, it is preferred that the content of the water-soluble component as the BaO component in the crystalline barium metasilicate be 0.5 to 30% by weight. It also is preferred that the component (E) be used in an amount of 1 to 25 parts by weight, especially 4 to 20 parts by weight, per 100 parts by weight of the component (A).

In the case where the object to be solidified is a granule of a water-absorbing substance such as anhydrous Glauber salt, it is preferred that a high condensate of naphthalene-sulfonic acid with formaldehyde or its salt (F) be incorporated as a water-retaining agent into the composition of the present invention. The above-mentioned granule absorbs water and by expansion of the volume thereof, cracks are formed in the solidified product. The component (F) prevents this undesirable phenomenon. As the salt, there can be used potassium, sodium, ammonium, amine and calcium salts. It is preferred that the component (F) be used in an amount of 0.1 to 20 parts by weight, especially 1 to 10 parts by weight, per 100 parts by weight of the component (A).

If natural or synthetic zeolite (C) is used in addition to the component (F), the water-retaining property is further improved. As the zeolite (G), there can be used clinoptilolite, erinite, mordenite, chabazite, zeolite X and zeolite Y. It is preferred that the zeolite (G) be used in an amount of 1 to 25 parts by weight, especially 2 to 10 parts by weight, per 100 parts by weight of the component (A).

The cement composition of the present invention may be packed in a package in advance, and various assistants or additives may be incorporated when the composition is actually used. For example, assistants such as hardening assistants other the components mentioned above, and additives such as reinforcers, aggregates, pigments, anchoring agents and initial tackifiers may be added.

The inorganic cement composition may be used singly or in combination with a known hardening assistant. As the hardening assistant, there can be added metal oxides and hydroxides such as calcium oxide, magnesium oxide, zinc oxide, aluminum oxide, magnesium hydroxide, calcium hydroxide and aluminum hydroxide, metal phosphates such as aluminum phosphate and calcium phosphates, and salts such as gypsum, calcium aluminate, barium sulfate and calcium silicate.

As the reinforcer, there can be used fibrous reinforcers such as staple fibers, slivers, mats, woven fabrics, non-woven fabrics and nets of glass fiber, rock wool, slag wool, asbestos, talc, carbon fiber and metal fiber, and fine powdery reinforcers such as carbon black, glass powder, white carbon, siliceous sand powder and various metal powders. As the filler, there can be used various inorganic fillers and aggregates such as kaolin, calcined clay, acid clay, activated clay, silicon dioxide, aluminosilicic acid, its salts, titanium dioxide, zirconium dioxide, alumina powder, barium sulfate, magnesium carbonate, magnesium oxide, calcium carbonate, calcium silicate, zinc oxide, gypsum, sand, rock, stone, fly ash and refractory mineral. In order to increase the strength of the cement composition of the present invention and adjust the water content to an appropriate level, hydration type cement powder such as Portland cement powder or alumina cement powder may be used. Furthermore, an organic filler such as a phenolic resin, a urea resin or CMC may be incorporated in the powdery form or in the form of a liquid.

As the pigment, there can be used white pigments such as titanium dioxide and colored pigments such as chrome yellow, red iron oxide, ultramarine, chrome green, mars violet and carbon black.

As the aggregate, acidic, neutral and basic refractory aggregates may be used according to the intended use. For example, there may be used $Al_2O_3$-$SiO_2$ type aggregates such as chamotte, agalmatolite, mullite and semi-silica high-alumina aggregate (pearlite), $SiO_2$ type aggregates such as siliceous sand, $Al_2O_3$ type aggregates such as corundum and electrolytic alumina, MgO—$SiO_2$ type aggregates such as forsterite, silicon carbide (SiC), graphite, chrome, chrome-magnesium and magnesium-chrome aggregates, magnesia clinker, electrolytic magnesia, calcined dolomite, magnesia, and calcia. These aggregates may be used singly or in the form of a mixture of two or more of them.

The aggregate is added after the known particle size adjustment. More specifically, the particle size distribution in the aggregate is adjusted so that coarser particles having a size of 1 to 5 mm occupy 10 to 70% by weight of the total particles and finger particles having a size smaller than 1 mm occupy 90 to 30% by weight of the total particles, and the particle size-adjusted aggregate is added to form a refractory composition. Of course, there may be adopted a method in which the aggregate is directly pulverized to attain a particle size distribution close to the above-mentioned particle size distribution and the pulverized aggregate is added without sieving or the like.

In order to temporarily increase the viscousness of the aqueous dispersion in the initial stage, a paste or a thickening agent such as a latex may be incorporated into the cement composition.

The kinds and amounts of the above-mentioned additives should be selected so that the adaptability of the final composition to various operations is not impaired.

The cement composition of the present invention can be used for the production of various molded articles. For example, the cement composition of the present invention is mixed with a fibrous or finely divided reinforcer or filler and optionally further with an aggregate, and is used for the production of various flame-retardant molded structures, for example, construction materials such as roofing materials, interior and exterior tiles, blocks, hollow wall materials, floor materials, partition materials, sound-insulating materials and refractory covers for steel frames for multistoried buildings, furnitures such as tables and chairs, tablewares and other vessels, various decorative articles, construction materials such as pipes, sheets, blocks, beams, poles and casings and ceramic bricks of a fixed form or irregular shape, and also for the treatment of industrial wastes, especially radioactive wastes, as an adhesive, a tackifier, a bonding agent, a fixing agent, a cementing agent, a joint filling agent or a binder.

Moreover, the cement composition of the present invention can effectively be used as an adhesive for the production of assemblies and bonded structures by bonding various ceramic products such as glass articles, bricks, slates, blocks and porcelains or metals.

Moreover, the cement composition of the present invention is effective for rendering bricks, porcelains, concrete products, gypsum boards, wood articles, paper products and fibrous products flame-retardant or water-impermeable by the immersion or surface treatment, and is also effective for forming fire-resistant coatings on these materials.

Still further, the cement composition of the present invention is coated as an inorganic paint or heat-resistant paint on various constructions, if necessary after incorporation of a filler or pigment.

When a solidified molded article, bonded structure or covered structure is prepared by using the cement composition of the present invention, hardening of an aqueous dispersion may be performed under normal conditions or under heat and pressure. More specifically, the hardening temperature is in the range of from room temperature to 200° C., especially from room temperature to 150° C., and the hardening pressure is in the range of from atmospheric pressure to about 10 $Kg/cm^2$. Ordinarily, the hardening atmosphere is air, but if desired, hardening may be carried out under reduced pressure or in an atmosphere of an inert gas such as nitrogen gas. Moreover, carbon dioxide gas may be used as the hardening atmosphere so as to shorten the hardening time. If a high humidity, for example, a relative humidity of at least 60%, preferably at least 80%, is maintained in the hardening atmosphere, both the interior and surface portions of the hardened product can be homogeneously hardened and the strength and other properties can be improved in the resulting hardened molded product.

The necessary hardening time varies according to the temperature and the kinds and amounts of the hardening agent and assistant, but it is preferred that an appropriate hardening time be selected within the range of from 2 minutes to 1 week according to the hardening temperature adopted. For example, when the coated composition is heated and hardened, a hardening time of about 2 to about 10 minutes results in sufficient hardening, and in case of room temperature hardening of a bonded structure or thick molded article, a time of about 1 week is sometimes necessary for obtaining a hardened product having a satisfactory mechanical strength.

By dint of the above-mentioned various characteristic properties of the present invention, various advantages can be attained when the cement composition of the present invention is used as a solidifying agent for radioactive wastes. The hydraulic cement composition of the present invention can be hardened with an extremely small normal consistency, and the obtained hardened product is excellent in various mechanical strength characteristics. Accordingly, a radioactive waste can be solidified by the cement composition of the present invention with an amount much smaller than the amounts required in case of the conventional hydraulic cements, and therefore, the radioactive waste can be packed and solidified in a vessel such as a drum can with a high volume reduction ratio. Although the normal consistency is small, the hydraulic cement composition of the present invention has a high fluidity, and when the composition of the present invention is poured into a vessel packed with the granulated radioactive waste, the composition is spread over the whole interior of the vessel and exerts a function to integrally cover and solidify the waste. Furthermore, since this solidifying agent is excellent in the denseness and water permeation resistance after hardening, even if the solidified product falls in contact with water, the waste is prevented from falling in direct contact with water and formation of cracks in the layer of the solidifying by a fire or the like is prevented. Moreover, the solidifying agent is excellent in the water resistance, acid resistance and weatherability and has a high resistance to sea water. When highly radioactive cesium is contained in a waste to be treated, the solidifying agent shows an unexpected effect of fixing this cesium and preventing dissolving-out thereof.

The present invention will now be described in detail with reference to the following Examples that by no means limit the scope of the invention.

EXAMPLE 1

Cement compositions will now be described.

A-1. Powdery Sodium Silicate

Four kinds of powdery sodium silicates commercially available, having a composition shown in Table 1, were selected.

TABLE 1

| Sample No. | SS-1 | SS-2 | SS-3 | SS-4 |
|---|---|---|---|---|
| Composition (%) | | | | |
| $SiO_2$ | 50.5 | 51.4 | 53.0 | 58.0 |
| $Na_2O$ | 34.3 | 25.0 | 22.1 | 18.0 |
| $SiO_2/Na_2O$ Molar Ratio | 1.52 | 2.12 | 2.48 | 3.2 |

A-2. Alkali Metal Borate Soluble in Alkaline Aqueous Solution

Three kinds of commercially available borates having a molecular formula shown in Table 2 were chosen.

TABLE 2

| Sample No. | B-1 | B-2 | B-3 |
|---|---|---|---|
| Molecular Formula | $Na_2B_4O_7 \cdot 10H_2O$ | $Na_2B_4O_7 \cdot 5H_2O$ | $K_2B_4O_7 \cdot 5H_2O$ |

A-3. Water-Soluble Alkali Metal Borosilicate

The above-mentioned sodium silicate and borate powders were homogeneously mixed at a ratio shown in Table 3 to obtain a binder [component (A)].

TABLE 3

| Sample No. | Sodium Silicate | | Borate | |
|---|---|---|---|---|
| | Kind | Amount (g) | Kind | Amount (g) |
| BSS-1 | SS-1 | 100 | B-2 | 10 |
| BSS-2 | SS-4 | 100 | B-2 | 10 |
| BSS-3 | SS-3 | 100 | B-2 | 10 |
| BSS-4 | SS-2 | 100 | B-1 | 10 |
| BSS-5 | SS-2 | 100 | B-3 | 10 |
| BSS-6 | SS-2 | 100 | B-2 | 4 |
| BSS-7 | SS-2 | 100 | B-2 | 6 |
| BSS-8 | SS-2 | 100 | B-2 | 15 |
| BSS-9 | SS-2 | 100 | B-2 | 35 |
| BSS-10 | SS-4 | 100 | B-2 | 10 |

A-4. Silicon Polyphosphate [hardening agent, composition (B)]

Eleven kinds of silicon polyphosphates prepared according to the methods disclosed in the specifications of our two patents (see Japanese Patent Publications Nos. 40866/71 and 42711/71) were chosen.

The $SiO_2/P_2O_5$ molar ratios in the prepared silicon polyphosphates, the kinds of the starting materials selected as the silicate component and the kinds of other components (such as $Al_2O_3$, $CaO$ and $MgO$) incorporated from the starting materials are shown in Table 4.

A typical example of the method for the preparation of silicon polyphosphate will now be described with reference to the following Referential Example 1.

[REFERENTIAL EXAMPLE 1]

Acid clay produced at Nakajo, Niigata Prefecture, Japan (the composition of the main components as solids: 78.7% of $SiO_2$, 13.1% of $Al_2O_3$, 0.57% of $Fe_2O_3$, 3.50% of $MgO$, 1.13% of $CaO$ and 3.15% of ignition loss) was treated according to the method disclosed in Japanese Patent Publication No. 2277/48 to form an easily reactive silicate to be used as the starting material. More specifically, 76.5 g, calculated as solids, of the above-mentioned acid clay (water content=42.5%) was charged in a conical beaker having a capacity of 500 ml, and 200 ml of an aqueous solution of sulfuric acid having a concentration of about 50% was added. The mixture was heated at 90° C. and the acid treatment was carried out for 10 hours. Then, washing was carried out by using a dilute aqueous solution of sulfuric acid having a pH value of 1.0 according to the decantation method, followed by water washing, whereby basic salts formed by the reaction were removed, and easily reactive silicic acid as special silicic acid gel (the composition of the main components as solids: 92.46% of $SiO_2$, 2.68% of $Al_2O_3$, 0.24% of $Fe_2O_3$, 0.13% of $MgO$, 0.13% of $CaO$ and 3.38% of ignition loss) was recovered from the acid clay. Commercially available phosphoric acid of the industrial grade (first class according to JIS; 85.0% of $H_3PO_4$ having a specific gravity of 1.69) was added to this easily reactive silicic acid so that the $SiO_2/P_2O_5$ molar ratio was 2.0, and the mixture was formed with stirring into granules having a diameter of about 0.5 mm to about 2 mm. The granules were dried at 170° to 200° C. and then calcined for about 30 minutes at 250° to 300° C. in a rotary kiln. Then, the calcination product was sintered for about 30 minutes at about 800°

C., pulverized by a hammer type pulverizer and classified by a 200-mesh sieve to obtain powdery silicon polyphosphate (PS-1).

Other silicon polyphosphates shown in Table 4 were prepared according to the method of Referential Example 1 while changing the silicic acid and phosphoric acid starting materials and changing the preparation conditions ($SiO_2/P_2O_5$ molar ratio, sintering conditions and the like). In the case where other components (for example, more than 1% of $Al_2O_3$, CaO, MgO and the like) were contained in the starting material in addition to silicic acid, the phosphoric acid was added in an amount corresponding to the sum of the amount necessary for forming normal salts of these basic components and the amount necessary for reacting with silicic acid ($SiO_2$) at a predetermined molar ratio.

With respect to the so-prepared silicon polyphosphates, the dispersibility and gelation time were determined according to the methods described below. The obtained results are shown in Table 4.

(A) Measurement of Dispersibility and Gelation Time

A measurement apparatus disclosed in FIG. 1 attached to the specification of our previous patent application (Japanese Patent Application No. 97558/81) was used for the measurement of the dispersibility and gelation time.

A vessel 1 (having an inner capacity of about 160 ml) secured in a water bath 2 maintained at a predetermined temperature (measurement temperature, 40° C. unless otherwise indicated (was charged with 30 g of a powdery sample, and 100 g of water glass (product No. 3 of JIS comprising 28.9% of $SiO_2$ and 9.63% of $Na_2O$) was added. A stirring vane 5 composed of stainless steel was put in the vessel and the stirring vane was directly rotated by a universal motor 3 (rating: 100 V input, 90 W, 4 poles, 50 Hz, 10 A, 3500 rpm). In the state of unloaded rotation, the voltage (direct current) was adjusted to 13.00 V, and in the state of unloaded rotation, the rotation speed was adjusted to 310 rpm by a rotation-adjusting knob 4 located in the upper portion of the motor. The torque (T, Kg.m) was calculated from the voltage, current and rotation number in the state of unloaded rotation according to the following formula (2):

$$T (kg \cdot m) = 0.9737 \times \frac{V \times I}{N} \quad (2)$$

wherein N stands for the rotation number (rpm), V stands for the voltage (V) and I stands for the current (A). It was found that the torque was in the range of from about 0.016 to about 0.020 Kg.m.

Water glass was added to the powdery sample in the vessel 1 of the measurement apparatus and the stirring vane 5 was rotated to form a homogeneous paste. The viscosity of the paste increased with the lapse of time to elevate the load current and reduce the rotation number, with the result that the torque was elevated. From the results of many preliminary experiments, it was determined that the torque T at the time of completion of gelation was 0.07 Kg.m. The time when the torque reached this value was checked, and this time was designated as the gelation time.

In ordinary inorganic binders, it is necessary that this gelation time should be longer than 100 minutes at 20° C. and longer than 20 minutes at 40° C. This also is required for the hardening agent component of the cement composition of the present invention.

If a sample became a homogeneous paste when water was added to the powdery sample and stirring was initiated, the sample was judged as having a good dispersibility. If an undissolved lump was formed or the sample was heterogeneous at the time of initiation of stirring, the sample was judged as having no good dispersibility. Of course, a sample having no good dispersibility cannot be used as the hardening agent in the present invention.

TABLE 4

| Sample No. | PS-1 | PS-2 | PS-3 | PS-4 | PS-5 | PS-6 | PS-7 | PS-8 | PS-9 | PS-10 | PS-11 |
|---|---|---|---|---|---|---|---|---|---|---|---|
| Starting Materials | | | | | | | | | | | |
| Silicic Acid | AS | AS | AS | commercially available silica gel powder | aluminum silicate | calcium silicate | magnesium silicate | Zeolite 4A | AS | AS | AS |
| Phosphoric Acid | PA | PA | PA | PA | PA | PA | PA | PA | pyrophosphoric acid | potassium phosphate | sodium phosphate |
| Other Incorporated Components | $Al_2O_3$ CaO MgO | $Al_2O_3$ CaO MgO | $Al_2O_3$ CaO MgO | — | $Al_2O_3$ | CaO | MgO | $Na_2O$ | $Al_2O_3$ $Al_2O_3$ | $Al_2O_3$ CaO MgO $K_2O$ | $Al_2O_3$ CaO, MgO CaO, MgO $Na_2O$ |
| Preparation Conditions | | | | | | | | | | | |
| $SiO_2/P_2O_5$ Molar Ratio | 2.0 | 2.5 | 3.0 | 3.0 | 3.0 | 3.0 | 3.0 | 3.0 | 3.0 | 2.2 | 2.2 |
| Sintering Temp. (°C.) | 850 | 850 | 800 | 850 | 800 | 800 | 800 | 800 | 700 | 700 | 700 |
| Sintering Time (min.) | 30 | 30 | 30 | 90 | 60 | 90 | 60 | 60 | 80 | 80 | 80 |
| Properties | | | | | | | | | | | |
| Dispersibility | good | good | good | good | good | good | good | good | good | good | good |
| Gelation Time (min.) (torque = 0.07 Kg/m) | 39 | 36 | 34 | 32 | 30 | 30 | 30 | 30 | 38 | 34 | 34 |

Note
AS: easily reactive silicic acid prepared from acid clay
PA: phosphoric acid of industrial grade A-5. Alkali Metal Silicofluoride [hardening assistant, component (C)]

Powders of commercially available industrial grade sodium silicofluoride ($Na_2SiF_6$) (NSF) and potassium silicofluoride ($K_2SiF_6$) (KSF) were chosen as the alkali metal silicofluoride.

A-6. Amorphous Barium Silicate [filling stabilizer, component (D)]

Commercially available amorphous barium silicate may be used, but in the present Example, amorphous barium silicate prepared by the following method described in Referential Example 2 as a typical preparation method was chosen.

[REFERENTIAL EXAMPLE 2]

Acid clay produced at Mutsune, Yamagata Prefecture, Japan (the composition of the main components as dry solids: 71.32% of $SiO_2$, 13.3% of $Al_2O_3$, 0.95% of CaO, 2.91% of MgO, 2.24% of $Fe_2O_3$ and 7.4% of ignition loss) was chosen as the silicic acid source, and commercially available barium carbonate ($BaCO_3$) was chosen as the barium source. Both the components were mixed together so that the $SiO_2$/BaO molar ratio was 3.0. The mixture was blended with 23% of water and the mixture was formed into granules having a diameter of about 1 to about 1 mm. The granules were dried and sintered at about 750° C. for 30 minutes in a rotary kiln. The sintered product was pulverized and was then sieved so that the particle size was smaller than $50\mu$, whereby fine particles of amorphous barium silicate (BALS-1) were prepared. This barium silicate had such a particle size distribution that particles having a size smaller than $10\mu$ occupied 50% by weight of the total particles, particles having a size of 10 to $30\mu$ occupied 30% by weight of the total particles and particles having a size of 30 to $60\mu$ occupied 20% by weight of the total particles. The pH value of a 5% aqueous dispersion of this barium silicate was 11.

A-7. Crystalline Barium Metasilicate [fluidity improver, component (E)]

Siliceous sand produced at Flattery (Australia), "Silton" (wet method silica supplied by Mizusawa Kagaku Kogyo) or a mixture thereof was used as the silicic acid source and commercially available barium carbonate was used as the barium source. Both the sources were mixed together so that the $SiO_2$/BaO molar ratio was 0.2 to 1, preferably 0.5 to 1, especially preferably 1. Then, 15 to 20% of water was added and the mixture was formed into granules having a diameter of about 10 mm. The granules were dried and sintered at 900° to 1200° C., preferably 1000° to 1100° C., for 0.5 to 1 hour in a rotary kiln. The sintered product was dry-pulverized and sieved so that particles having a size smaller than $60\mu$ occupied more than 95% of the total particles to obtain crystalline barium metasilicate indicated below.

| Sample No. | Silicic Acid Source | $SiO_2$/BaO Molar Ratio | Sintering Conditions | Water-Soluble BaO Content (%) |
| --- | --- | --- | --- | --- |
| CBM-1 | siliceous sand | 1 | 1000° C. × 1 hour | 25 |
| CBM-2 | " | 0.75 | " | 18 |
| CBM-3 | " | 0.5 | " | 12 |
| CBM-4 | " | 1 | 1100° C. × 0.5 hour | 30 |
| CBM-5 | " | 1 | 900° C. × 1.5 hours | 4.5 |
| CBM-6 | " | 1 | 800° C. × 2 hours | 2.5 |
| CBM-7 | Silton | 1 | 1000° C. × 1 hour | 10 |
| CBM-8 | siliceous sand (1 part) + Silton (1 part) | 1 | 1000° C. × 1 hour | 20 |

A-8. Water-Retaining Agent

A commercially available high condensate of naphthalene-sulfonic acid with formaldehyde ("Demol N" supplied by Kao Soap K.K.) was used as the water-retaining agent (WRA).

A-9. Water-Retaining Assistant

A commercially available zeolite powder (NZ) was used as the water-retaining assistant.

A-10. Aggregate

A commercially available inorganic chemical powder, pigment or refractory powder shown below was used as the aggregate.

| Sample Symbol | Aggregate | Main Component |
| --- | --- | --- |
| AG-CS | calcium silicate | $CaO.SiO_2$ |
| AG-MS | magnesium silicate | $MgO.SiO_2$ |
| AG-C | carbon | C |
| AG-FE | red iron oxide | $FE_2O_3$ |
| AG-TI | titanium oxide | $TiO_2$ |
| AG-MG | natural magnesia | MgO |
| AG-AL | mullite | $Al_2O_3$ |
| AG-SI | powdery siliceous sand | $SiO_2$ |
| AG-GF | glass fiber | $SiO_2$ |
| AG-A | asbestos | $MgO.SiO_2$ |

B-1. Aqueous Paste of Cement Composition and Solidified Product

A powder of a hydraulic cement composition shown in Table 5 was stirred or shaken with a predetermined normal consistency to form a homogeneous aqueous paste. The paste was cast in a columnar mold frame (30 mm in inner diameter and 15 mm in height) and hardened at a temperature of 25° C. in an atmosphere having a relative humidity of 75%. The properties described below were determined according to methods (B) through (K) described below. The obtained results are shown in Table 6.

In order to clarify the effects of the present invention, comparative compositions (prefix "H" is added to the sample number) shown in Table 5 were similarly tested. The obtained results are shown in Table 6.

(B) Flow Value

The powder of the cement composition was formed into a homogeneous aqueous paste (fluid) with a predetermined normal consistency (% by weight). At predetermined time intervals, a predetermined amount of the sample was cast on a inclined glass sheet (inclination angle=50°) and the initial flow value (cm) for 1 minute was measured. This value was designated as the flow value (cm/min) and the flow characteristic of the aqueous paste was evaluated from this value.

(C) Solidification Time

The aqueous paste is gelled and hardened with the lapse of time according to the temperature and humidity of the atmosphere to form a hard solidified product.

Accordingly, the aqueous paste was allowed to stand still at a temperature of 25° C. and a relative humidity of 75%, and the time when the pencil lead having a hardness of HB was not stuck into the hardened product was measured and this time was designated as the solidification time (hours).

(D) Water Permeability

A solidified product having a diameter of 3 cm and a height of 1.5 cm was immersed in colored water kept still for 30 days, and the length (mm) of permeation of colored water from the side face of the solidified product was measured and the water permeability was evaluated based on this value.

(E) Water Resistance

A solidified product having the same dimensions as those of the solidified product used in (D) above was immersed in water kept still, and when cracking, collapse, swelling or other form change was not caused over a period of at least 60 days, the sample was judged as having a sufficient water resistance.

(F) Flexural Strength and Crushing Strength

With respect to a solidified product having a good water resistance, according to JIS A-1106, a sample having a square section was formed and aged for 3 days in an atmosphere maintained at a temperature of 25° C. and a relative humidity of 75%. Then, the sample was immersed in water kept still and maintained at 20° to 25° C. for 27 days, and the flexural strength (Kg/cm$^2$) was measured according to the three-point bending method. Then, according to JIS A-1114, the crushing strength (Kg/cm$^2$) of the bent piece obtained at the above bending test was measured. The mechanical strength characteristics were evaluated based on these values.

(G) Fire Resistance

A solidified product having a diameter of 4 cm and a height of 3 cm was absuptly charged in an electric furnace maintained at 800° C. and was allowed to stand still in the furnace for 30 minutes, and the sample was taken out into the room temperature atmosphere. The fire resistance was evaluated based on whether or not the form was changed or cracks were formed.

(H) Moisture Resistance

A solidified product having the same dimensions as those of the solidified product tested in (G) above was exposed to an atmosphere maintained at a relative humidity higher than 90% and a temperature of 45° C. The moisture resistance was evaluated based on whether or not bleeding, deformation or cracking was caused.

(I) Falling Strength

A solidified product having the same dimensions as those of the solidified product tested in (G) above was let to fall down from a height of 10 m, and the destruction ratio (% by weight) was determined and the falling strength was evaluated based on this value.

(J) Cesium Dissolution Ratio

A solidified product having the same dimensions as those of the solidified product tested in (G) above, which was homogeneously packed with a water-soluble cesium salt, was immersed in water kept still, and the dissolution ratio (% by weight) of cesium from the solidified product was measured and the cesium-blocking activity of the solidified product was evaluated based on this value.

(K) Resistance to Outdoor Exposure

With respect to a solidified product having a good water resistance, according to JIS A-1106, a sample having a square section was formed and was subjected to outdoor exposure for 60 days. In the same manner as described in (F) above, the flexural strength and crushing strength were determined and the outdoor exposure resistance was evaluated based on these values.

(L) pH Value of Dispersion

The pH value of a 5% by weight aqueous dispersion of the powdery sample was measured.

(M) Normal Consistency

The amount (% by weight) of added water in the paste was desginated as the normal consistency.

| Sample | Binder | | Hardening Agent | | Hardening Assistant | |
|---|---|---|---|---|---|---|
| No. | Kind | Amount (g) | Kind | Amount (g) | Kind | Amount (g) |
| 1-1 | BSS-1 | 100 | PS-1 | 30 | NSF | 60 |
| 1-2 | BSS-1 | 100 | PS-1 | 30 | NSF | 60 |
| 1-3 | BSS-1 | 100 | PS-3 | 30 | NSF | 60 |
| 1-4 | BSS-1 | 100 | PS-4 | 30 | NSF | 60 |
| 1-5 | BSS-1 | 100 | PS-5 | 30 | NSF | 60 |
| 1-6 | BSS-1 | 100 | PS-6 | 30 | NSF | 60 |
| 1-7 | BSS-1 | 100 | PS-7 | 30 | NSF | 60 |
| 1-8 | BSS-1 | 100 | PS-8 | 30 | NSF | 60 |
| 1-9 | BSS-1 | 100 | PS-9 | 30 | NSF | 60 |
| 1-10 | BSS-1 | 100 | PS-10 | 30 | NSF | 60 |
| 1-11 | BSS-1 | 100 | PS-11 | 30 | NSF | 60 |
| 1-12 | BSS-2 | 100 | PS-1 | 30 | NSF | 60 |
| 1-13 | BSS-3 | 100 | PS-1 | 30 | NSF | 60 |
| 1-14 | BSS-4 | 100 | PS-1 | 30 | NSF | 60 |
| 1-15 | BSS-5 | 100 | PS-1 | 30 | KSF | 60 |
| 1-16 | BSS-6 | 100 | PS-1 | 30 | NSF | 60 |
| 1-17 | BSS-7 | 100 | PS-1 | 30 | NSF | 60 |
| 1-18 | BSS-8 | 100 | PS-1 | 30 | NSF | 60 |
| 1-19 | BSS-9 | 100 | PS-1 | 30 | NSF | 60 |
| 1-20 | BSS-10 | 100 | PS-1 | 40 | NSF | 60 |
| 1-21 | BSS-1 | 100 | PS-1 | 20 | NSF | 60 |
| 1-22 | BSS-1 | 100 | PS-1 | 30 | NSF | 50 |
| 1-23 | BSS-1 | 100 | PS-1 | 30 | NSF | 30 |

-continued

| | | | | | | | |
|---|---|---|---|---|---|---|---|
| 1-24 | BSS-1 | 100 | PS-1 | 30 | NSF | 60 |
| 1-25 | BSS-1 | 100 | PS-1 | 30 | NSF | 60 |
| 1-26 | BSS-1 | 100 | PS-1 | 30 | NSF | 60 |
| 1-27 | BSS-1 | 100 | PS-1 | 30 | NSF | 60 |
| 1-28 | BSS-1 | 100 | PS-1 | 30 | NSF | 60 |
| 1-29 | BSS-1 | 100 | PS-1 | 30 | NSF | 60 |
| 1-30 | BSS-1 | 100 | PS-1 | 30 | NSF | 60 |
| 1-31 | BSS-1 | 100 | PS-1 | 30 | NSF | 60 |
| 1-32 | BSS-1 | 100 | PS-1 | 30 | NSF | 60 |
| 1-33 | BSS-1 | 100 | PS-1 | 30 | NSF | 60 |
| 1-34 | BSS-1 | 100 | PS-1 | 30 | NSF | 60 |
| 1-35 | BSS-1 | 100 | PS-1 | 30 | NSF | 60 |
| 1-36 | BSS-1 | 100 | PS-1 | 50 | NSF | 60 |
| 1-37 | BSS-1 | 100 | PS-1 | 30 | NSF | 20 |
| 1-38 | BSS-1 | 100 | PS-1 | 20 | NSF | 60 |
| 1-39 | BSS-1 | 100 | PS-1 | 30 | NSF | 60 |
| 1-40 | BSS-1 | 100 | PS-1 | 30 | NSF | 60 |
| 1H-1 | BSS-1 | 100 | PS-1 | 30 | NSF | 10 |
| 1H-2 | BSS-1 | 100 | PS-1 | 10 | NSF | 60 |
| 1H-3 | BSS-1 | 100 | PS-1 | 18 | NSF | 30 |
| 1H-4 | BSS-1 | 100 | PS-1 | 30 | NSF | 60 |
| 1H-5 | BSS-1 | 100 | PS-1 | 40 | NSF | 20 |
| 1H-6 | 100 g of Portland cement powder | | | | | |
| 1H-7 | 100 g of Portland cement powder | | | | | |
| 1H-8 | 100 g of Portland cement powder | | | | | |

| Sample No. | Filling Stabilizer | | Aggregate | | Other Component | | Normal Consistency (%) |
|---|---|---|---|---|---|---|---|
| | Kind | Amount (g) | Kind | Amount (g) | Kind | Amount (g) | |
| 1-1 | BALS-1 | 28 | AG-CS | 10 | — | — | 25 |
| 1-2 | BALS-1 | 28 | AG-CS | 10 | — | — | 25 |
| 1-3 | BALS-1 | 30 | AG-CS | 10 | — | — | 25 |
| 1-4 | BALS-1 | 28 | AG-CS | 10 | — | — | 25 |
| 1-5 | BALS-1 | 28 | AG-CS | 10 | — | — | 25 |
| 1-6 | BALS-1 | 30 | AG-CS | 10 | — | — | 25 |
| 1-7 | BALS-1 | 28 | AG-CS | 10 | — | — | 25 |
| 1-8 | BALS-1 | 28 | AG-CS | 10 | — | — | 25 |
| 1-9 | BALS-1 | 28 | AG-CS | 10 | — | — | 25 |
| 1-10 | BALS-1 | 28 | AG-CS | 10 | — | — | 25 |
| 1-11 | BALS-1 | 28 | AG-CS | 10 | — | — | 25 |
| 1-12 | BALS-1 | 28 | AG-CS | 10 | — | — | 25 |
| 1-13 | BALS-1 | 28 | AG-CS | 10 | — | — | 25 |
| 1-14 | BALS-1 | 28 | AG-CS | 10 | — | — | 25 |
| 1-15 | BALS-1 | 28 | AG-CS | 10 | — | — | 25 |
| 1-16 | BALS-1 | 28 | AG-CS | 10 | — | — | 25 |
| 1-17 | BALS-1 | 10 | AG-CS | 10 | — | — | 25 |
| 1-18 | BALS-1 | 30 | AG-CS | 10 | — | — | 25 |
| 1-19 | BALS-1 | 30 | AG-CS | 10 | — | — | 25 |
| 1-20 | BALS-1 | 30 | — | — | — | — | 25 |
| 1-21 | BALS-1 | 30 | — | — | — | — | 25 |
| 1-22 | BALS-1 | 30 | — | — | — | — | 25 |
| 1-23 | BALS-1 | 30 | — | — | — | — | 25 |
| 1-24 | BALS-1 | 35 | — | — | — | — | 25 |
| 1-25 | BALS-1 | 20 | — | — | — | — | 25 |
| 1-26 | BALS-1 | 30 | AG-MS | 10 | — | — | 27 |
| 1-27 | BALS-1 | 30 | AG-CS<br>AG-C | 9<br>1 | — | — | 27 |
| 1-28 | BALS-1 | 30 | AG-MG | 10 | — | — | 27 |
| 1-29 | BALS-1 | 30 | AG-CS<br>AG-FE | 9<br>1 | — | — | 27 |
| 1-30 | BALS-1 | 30 | AG-CS<br>AG-TI | 9<br>1 | — | — | 30 |
| 1-31 | BALS-1 | 30 | AG-AL | 10 | — | — | 27 |
| 1-32 | BALS-1 | 30 | AG-SI | 10 | — | — | 28 |
| 1-33 | BALS-1 | 30 | AG-CS<br>AG-GF | 7<br>3 | — | — | 28 |
| 1-34 | BALS-1 | 30 | AG-CS<br>AG-A | 7<br>3 | — | — | 23 |
| 1-35 | BALS-1 | 30 | AG-CS | 10 | — | — | 18 |
| 1-36 | BALS-1 | 50 | AG-CS | 10 | — | — | 30 |
| 1-37 | BALS-1 | 40 | AG-CS | 10 | — | — | 30 |
| 1-38 | BALS-1 | 80 | — | — | — | — | 30 |
| 1-39 | BALS-1 | 28 | AG-CS | 10 | CBM-1 | 5 | 25 |
| 1-40 | BALS-1 | 28 | AG-CS | 10 | WRA<br>NZ | 2.5<br>7 | 25 |
| 1H-1 | BALS-1 | 30 | — | — | — | — | 25 |
| 1H-2 | BALS-1 | 30 | — | — | — | — | 25 |
| 1H-3 | BALS-1 | 60 | — | — | — | — | 25 |
| 1H-4 | BALS-1 | 0 | AG-CS | 10 | — | — | 25 |
| 1H-5 | BALS-1 | 0 | AG-CS | 10 | — | — | 25 |
| 1H-6 | | | — | — | — | — | 28 |
| 1H-7 | | | — | — | — | — | 32 |

-continued

| | | | | | | |
|---|---|---|---|---|---|---|
| 1H-8 | — | — | — | — | 40 | |

TABLE 6

| Sample No. | Flow Value (cm/min) | Solidification Time (hours) | Water Permeability (mm) 9 days | Water Permeability (mm) 30 days | Water Resistance | Flexural Strength (kg/cm$^2$) | Crushing Strength (kg/cm$^2$) | Fire Resistance |
|---|---|---|---|---|---|---|---|---|
| 1-1 | 63 | 13 | 0.1 | 0.3 | good | 96 | 330 | good |
| 1-2 | 54 | 15 | 0.2 | 0.5 | good | 85 | 290 | good |
| 1-3 | 53 | 18 | 0.2 | 0.4 | good | 86 | 300 | good |
| 1-4 | 48 | 20 | 0.4 | 0.8 | good | 65 | 190 | good |
| 1-5 | 50 | 19 | 0.5 | 0.8 | good | 70 | 210 | good |
| 1-6 | 53 | 27 | 0.5 | 0.9 | good | 75 | 220 | good |
| 1-7 | 49 | 25 | 0.6 | 1.2 | good | 68 | 230 | good |
| 1-8 | 45 | 19 | 0.6 | 1.2 | good | 75 | 220 | good |
| 1-9 | 43 | 21 | 0.3 | 0.6 | good | 65 | 210 | good |
| 1-10 | 46 | 21 | 0.3 | 0.6 | good | 70 | 240 | good |
| 1-11 | 48 | 19 | 0.3 | 0.7 | good | 65 | 220 | good |
| 1-12 | 52 | 15 | 0.1 | 0.4 | good | 85 | 285 | good |
| 1-13 | 53 | 14 | 0.2 | 0.5 | good | 80 | 280 | good |
| 1-14 | 51 | 18 | 0.2 | 0.5 | good | 86 | 270 | good |
| 1-15 | 52 | 17 | 0.2 | 0.4 | good | 85 | 260 | good |
| 1-16 | 50 | 13 | 0.2 | 0.4 | good | 80 | 290 | good |
| 1-17 | 59 | 20 | 0.4 | 0.8 | good | 80 | 240 | good |
| 1-18 | 53 | 14 | 0.2 | 0.5 | good | 86 | 285 | good |
| 1-19 | 49 | 15 | 0.1 | 0.4 | good | 85 | 300 | good |
| 1-20 | 51 | 10 | 0.3 | 0.5 | good | 90 | 320 | good |
| 1-21 | 65 | 33 | 0.5 | 0.9 | good | 95 | 220 | good |
| 1-22 | 53 | 16 | 0.1 | 0.3 | good | 88 | 280 | good |
| 1-23 | 43 | 8 | 0.4 | 0.8 | good | 90 | 250 | good |
| 1-24 | 46 | 12 | 0.2 | 0.6 | good | 90 | 320 | good |
| 1-25 | 58 | 16 | 0.2 | 0.5 | good | 96 | 240 | good |
| 1-26 | 53 | 17 | 0.2 | 0.4 | good | 65 | 270 | good |
| 1-27 | 52 | 15 | 0.1 | 0.3 | good | 67 | 280 | good |
| 1-28 | 53 | 14 | 0.1 | 0.5 | good | 70 | 260 | good |
| 1-29 | 52 | 16 | 0.2 | 0.6 | good | 75 | 290 | good |
| 1-30 | 70 | 18 | 0.4 | 0.8 | good | 80 | 260 | good |
| 1-31 | 60 | 19 | 0.6 | 1.3 | good | 85 | 280 | good |
| 1-32 | 59 | 18 | 0.3 | 0.6 | good | 80 | 270 | good |
| 1-33 | 64 | 16 | 0.4 | 0.7 | good | 90 | 260 | good |
| 1-34 | 42 | 17 | 0.4 | 0.7 | good | 85 | 270 | good |
| 1-35 | 30 | 11 | 0.05 | 0.2 | good | 100 | 350 | good |
| 1-36 | 36 | 13 | 0.6 | 0.9 | good | 95 | 340 | good |
| 1-37 | 56 | 14 | 0.3 | 0.9 | good | 85 | 280 | good |
| 1-38 | 42 | 26 | 0.8 | 2.6 | good | 79 | 270 | good |
| 1-39 | 75 | 24 | 0.05 | 0.2 | good | 100 | 350 | good |
| 1-40 | 75 | 24 | 0.02 | 0.1 | good | 110 | 380 | good |
| 1H-1 | 20 | 15 | 4.5 | 13.5 | good | 60 | 170 | insufficient |
| 1H-2 | 75 | 130 | 4.6 | 14 | insufficient | 65 | 180 | insufficient |
| 1H-3 | 15 | 32 | 5.2 | 14.5 | good | 86 | 180 | insufficient |
| 1H-4 | 120 | 55 | 6.5 | 20 | insufficient | 20 | 70 | insufficient |
| 1H-5 | 56 | 12 | 4.5 | 10.5 | insufficient | 30 | 50 | insufficient |
| 1H-6 | 5 | 65 | 6.5 | 14.8 | good | 85 | 200 | insufficient |
| 1H-7 | 38 | 75 | 8.9 | 16.5 | good | 75 | 180 | insufficient |
| 1H-8 | 56 | 80 | 12.5 | 24.5 | good | 65 | 160 | insufficient |

| Sample No. | Moisture Resistance | Falling Strength (% by weight) | Cesium Dissolution Ratio (%) 5 days | Cesium Dissolution Ratio (%) 50 days | Outdoor Exposure Resistance Flexural Strength (kg/cm$^2$) | Outdoor Exposure Resistance Crushing Strength (kg/cm$^2$) |
|---|---|---|---|---|---|---|
| 1-1 | good | 0.1 | 0.5 | 0.7 | 55 | 240 |
| 1-2 | good | 0.2 | 0.8 | 1.0 | | |
| 1-3 | good | 0.4 | 1.0 | 1.2 | 56 | 230 |
| 1-4 | good | 0.3 | 2.0 | 2.5 | | |
| 1-5 | good | 0.1 | 2.5 | 2.5 | | |
| 1-6 | good | 0.5 | 2.0 | 2.2 | 40 | 160 |
| 1-7 | good | 0.4 | 2.2 | 2.5 | | |
| 1-8 | good | 0.7 | 2.5 | 2.5 | | |
| 1-9 | good | 0.5 | 2.0 | 2.2 | 35 | 160 |
| 1-10 | good | 0.6 | 2.0 | 2.2 | | |
| 1-11 | good | 0.2 | 1.5 | 1.7 | | |
| 1-12 | good | 0.1 | 0.6 | 0.8 | 50 | 180 |
| 1-13 | good | 0.5 | 1.1 | 1.5 | | |
| 1-14 | good | 1.1 | 0.9 | 1.5 | | |
| 1-15 | good | 1.0 | 1.5 | 2.0 | | |
| 1-16 | good | 0.5 | 1.2 | 2.0 | | |
| 1-17 | good | 0.7 | 1.4 | 1.8 | 45 | 170 |
| 1-18 | good | 0.2 | 2.0 | 2.4 | | |
| 1-19 | good | 0.3 | 1.5 | 2.6 | | |

TABLE 6-continued

| | | | | | | |
|---|---|---|---|---|---|---|
| 1-20 | good | 0.5 | 0.9 | 1.6 | 65 | 250 |
| 1-21 | good | 0.2 | 2.2 | 2.7 | | |
| 1-22 | good | 0.1 | 2.1 | 2.5 | 55 | 200 |
| 1-23 | good | 0.2 | 1.8 | 2.2 | | |
| 1-24 | good | 0.2 | 2.1 | 2.9 | 70 | 270 |
| 1-25 | good | 0.1 | 2.1 | 2.3 | 60 | 190 |
| 1-26 | good | 1.3 | 1.8 | 2.5 | | |
| 1-27 | good | 1.2 | 2.0 | 2.6 | | |
| 1-28 | good | 0.8 | 1.8 | 2.2 | 40 | 150 |
| 1-29 | good | 0.7 | 1.5 | 2.0 | | |
| 1-30 | good | 0.9 | 2.0 | 2.3 | 40 | 180 |
| 1-31 | good | 1.2 | 1.8 | 2.2 | 55 | 210 |
| 1-32 | good | 1.1 | 1.2 | 1.5 | | |
| 1-33 | good | 0.3 | 2.5 | 2.7 | | |
| 1-34 | good | 0.2 | 2.2 | 2.7 | 50 | 180 |
| 1-35 | good | 0.2 | 0.2 | 0.7 | | |
| 1-36 | good | 0.8 | 0.6 | 0.9 | 45 | 280 |
| 1-37 | good | 1.4 | 2.0 | 2.2 | | |
| 1-38 | good | 2.9 | 1.8 | 2.1 | | |
| 1-39 | good | 0.2 | 0.2 | 0.7 | 55 | 130 |
| 1-40 | good | 0.2 | 0.2 | 0.7 | 60 | 140 |
| 1H-1 | good | 0.8 | 2.7 | 2.9 | | |
| 1H-2 | insufficient | 3.8 | 2.7 | 2.8 | | |
| 1H-3 | good | 1.2 | 2.8 | 3.5 | | |
| 1H-4 | insufficient | 6.8 | 2.7 | 3.2 | 10 | 60 |
| 1H-5 | insufficient | 0.3 | — | — | 0 | 20 |
| 1H-6 | good | 0.6 | 40 | 60 | | |
| 1H-7 | good | 3.6 | 48 | 65 | | |
| 1H-8 | good | 4.5 | 55 | 70 | 55 | 160 |

From the data shown in Tables 5 and 6, it will readily be understood that in the cement composition of the present invention, the binder (A), hardening agent (B), hardening assistant (C) and filling stabilizer (D) have synergistic actions on the properties and effects of the aqueous paste of the powdery composition and the solidified product thereof. Furthermore, it will be seen that in connection with the reduction of the fluidity due to elevation of the viscosity with the lapse of time in the aqueous paste, the component (D) acts as the hardening assistant to the hardening agent (A) and is effective for controlling reduction of the fluidity (flow value) due to elevation of the viscosity, and that when the component (D) is incorporated, the water-resistant strength, water permeation resistance and mechanical strength of the solidified product are improved over those of the solidified product comprising the components (A), (B) and (C) (comparative composition 1H-4). Accordingly, it will readily be understood that the component (D) is effective as the filling stabilizer in the cement composition of the present invention.

Moreover, it is seen that the aqueous paste of the powdery cement composition of the present invention is excellent in the fluidity over the conventional cements even though the normal consistency is small and this aqueous paste is characterized in that the solidification time is relatively short and the solidification time can be adjusted within a certain range.

Still further, it is seen that the cesium ion dissolution ratio of the solidified product of the present invention is much lower than those of the solidified products of the conventional cements. This means that the cement composition of the present invention has an ion-exchange capacity and has a function to chemically fix dissolved ions in the solidified product.

EXAMPLE 2

Cement compositions were prepared in the same manner as described in Example 1 except that the conditions for the preparation of amorphous barium silicate [filling stabilizer, component (D)], for example, the $SiO_2/BaO$ molar ratio, the sintering temperature and the pulverizing method were changed to obtain filling stabilizers differing in the particle size distribution and the dispersed pH value, and influences of these filling stabilizers on the properties and effects of the aqueous pastes of cement compositions and solidified products thereof were examined.

A cement composition comprising 100 g of sodium silicate (BSS-1), 30 g of silicon polyphosphate (PS-1) and 60 g of the hardening assistant (NSF) was mixed with 28 g of one filling stabilizer selected from 13 filling stabilizers BALS-2 through BALS-14 shown in Table 7, and the resulting powdery composition was formed into a homogeneous aqueous paste with a normal consistency of 25% and the dispersibility of the filling stabilizer was evaluated. The flow value of the paste was measured in the same manner as described in Example 1, and the paste was cast in the same mold frame as used in Example 1 and allowed to stand still in an atmosphere maintained at a temperature of 25° C. and a relative humidity of 75% for 3 days. The water permeability and crushing strength of the obtained solidified product were measured. The obtained results are shown in Table 7.

Incidentally, BALS-12 used for sample 2-11 shown in Table 7 was prepared by finely pulverizing BALS-9 in a wet pot mill. The dispersibility of the filling stabilizer in the aqueous paste was evaluated according to the following rating:

⊙: best
○: good
△: insufficient

Furthermore, the crushing strength in Table 7 is a normal state value determined before immersion in water.

TABLE 7

| Sample No. | Filling Stabilizer Starting Material | SiO₂/BaO Molar Ratio | Sintering Conditions (°C. × hours) | Particle Size Distribution (μ) | Dispersibility | Flow Value (cm/min) | Water Permeability (mm) 9 days | Water Permeability (mm) 30 days | Crushing Strength (kg/cm²) | Dispersion pH Value of BALS |
|---|---|---|---|---|---|---|---|---|---|---|
| 2-1 | BALS-2 | 5 | 700 × 1 | <50 | ◎ | 45 | 0.1 | 0.25 | 330 | 9.3 |
| 2-2 | BALS-3 | 5 | 800 × 1 | <47 | ◎ | 53 | 0.1 | 0.2 | 360 | 10.7 |
| 2-3 | BALS-4 | 5 | 900 × 0.5 | <55 | ○ | 54 | 0.8 | 1.8 | 390 | 12.1 |
| 2-4 | BALS-5 | 4 | 700 × 1 | <35 | ◎ | 47 | 0.1 | 0.4 | 280 | 9.3 |
| 2-5 | BALS-6 | 4 | 800 × 1 | <45 | ◎ | 50 | 0.1 | 0.25 | 310 | 11.6 |
| 2-6 | BALS-7 | 4 | 900 × 1 | <60 | ○ | 55 | 0.1 | 1.2 | 360 | 12.7 |
| 2-7 | BALS-8 | 3 | 700 × 1 | <30 | ◎ | 52.5 | 0.1 | 0.6 | 290 | 8.9 |
| 2-8 | BALS-9 | 3 | 800 × 1 | <50 | ◎ | 50 | 0.1 | 0.2 | 320 | 11.2 |
| 2-9 | BALS-10 | 3 | 900 × 1 | <60 | ○ | 58 | 0.2 | 1.3 | 290 | 12.4 |
| 2-10 | BALS-11 | 3 | 1000 × 1 | 20<<40 | △ | 58 | 0.4 | 2.2 | 250 | 12.7 |
| 2-11 | BALS-12 | 3 | 800 × 1 | <4 | ◎ | 42 | 1.1 | 2.1 | 390 | 11.3 |
| 2-12 | BALS-13 | 3 | 800 × 3 | <70 | △ | 54 | 0.2 | 0.9 | 260 | 11.0 |
| 2H-1 | BALS-14 | 4 | 400 × 2 | <50 | ◎ | 4.5 | 12.5 | 290 | 6.8 | |

From the results shown in Table 7, it will readily be understood that the filling stabilizer (BALS) in the cement composition of the present invention not only has the synergistic filling stabilizing action described in Example 1 but also has influences on the dispersibility in the paste, the flow value as the fluidity characteristic of the paste and the water permeation resistance of the solidified product according to the particle size distribution and dispersion pH value of the filling stabilizer which are changed by the preparation conditions. It will also be understood that the sintering temperature to be adopted for the production of BALS is preferably 700° to 800° C. Moreover, with respect to the particle size distribution, as is seen in case of the starting materials other than BALS-11 and BALS-12, a powder having a relatively broad particle size distribution is preferred from the viewpoint of the water permeation resistance.

EXAMPLE 3

Applications of the hydraulic cement composition of the present invention will now be described in this Example.

3-1. Bonding Effect

Powder sample 1-1 shown in Table 5 of Example 1 was formed into a homogeneous paste with a normal consistency of 20 or 25%, and the bonding effect was examined according to the method described below. The obtained results are shown in Table 8. Incidentally, in order to clarify the effects of the composition of the present invention, comparative sample 1H-5 was formed into a paste with a normal consistency of 20% and the paste was similarly tested.

According to the method of JIS K-6852, a steel plate and an asbestos sheet having a thickness of 0.5 cm were cut into rectangular test pieces having a size of 30 cm×25 cm. The surface to be bonded of the steel plate was polished with an abrasive paper #240 until a metallic luster was observed, and the surface was cleanly washed with trichloroethylene and dried.

The paste was caoted in a thickness of about 2 mm on the rectangular asbestos cut piece over an area of 25 cm×25 cm and the rectangular steel plate test piece was placed on the asbestos test piece over the corresponding area of 25 cm×25 cm so that non-bonded selvage portions (5 cm×25 cm) were linearly protruded on both the sides and the paste was not forced out from the bonded area. In this manner, six bonded test pieces were prepared for each sample paste. The test pieces were subjected to the crushing strength test under the following three conditions.

(1) The test piece was allowed to stand still at a temperature of 25° C. and a relative humidity of 75% for 1 day and the strength was measured in this state (normal state strength).

(2) The test piece prepared in (1) above was allowed to stand still at a temperature of 45° C. and a relative humidity of 100%, and the strength was similarly measured (moisture-resistant strength).

(3) The test piece prepared in (1) above was immersed in water maintained at 25° C. for 3 days, and the strength was measured in the water-adhering state without particular drying (water-resistant strength).

The crushing strength was measured by using a crushing fracture strength tester in the following manner.

Both the selvage portions of the bonded test pieces were erected, and a pressure was applied thereto and the selvage portions were compressed until fracture was caused in the bonded surface or the asbestos sheet. The applied load (kg/cm²) was determined and the bonding strength was evaluated based on the botained value.

TABLE 8

| Sample No. | Cement Composition No. | Normal Consistency (%) | Bonding Strength (kg/cm²) normal strength | Bonding Strength (kg/cm²) moisture-resistant strength | Bonding Strength (kg/cm²) Water resistant strength |
|---|---|---|---|---|---|
| 3-1 | 1-1 | 20 | 58 | 60 | 35 |
| 3-2 | 1-1 | 25 | 53 | 56 | 27 |
| 3H-1 | 1H-5 | 20 | 52 | 10 | 6 |

From the results shown in Table 8, it will readily be understood that the aqueous paste of the hydraulic cement composition of the present invention is excellent in the bonding effect and can effectively be used as an inorganic adhesive, hole-filling agent, joint filler or cementing agent.

3-2. Solidification of Pelletized Radioactive Waste

A radioactive waste formed in an atomic power plant is homogeneously mixed and solidified with cement or asphalt in a vessel and is stored in this state. According to the conventional method, however, the amount of the radioactive waste that can be packed in the vessel is small, and the number of packed vessels stored is increased. Accordingly, increase of the volume reduction ratio is desired.

As means for reducing the volume of the stored packed vessel, there has been proposed a method in which a dry powder of a radioactive waste is compression-molded into coconut-shaped pellets having a size of 35 mm×25 mm×13 mm and is then solidified in a vessel with asphalt (see Japanese Patent Application Laid-Open Specification No. 85699/77 and No. 85700/77).

The aqueous paste of the cement composition of the present invention was cast into 30 vessels packed with pelletized solids prepared according to the above-mentioned known method composed mainly of anhydrous Glauber salt; supplied from Hitachi Plant of Hitachi K.K.) and was completely solidified at a temperature of 25° C. and a relative humidity of 75%. The solidified products (having an outer diameter of 80 mm and a height of 120 mm) were taken out from the vessels, and the properties of the solidified products were determined. The obtained results are shown in Table 9.

In order to clarify the effects of the composition of the present invention, solidified products were similarly prepared and tested by using the conventional cements.

TABLE 9

| Sample No. | Cement Composition No. | Normal Consistency (%) | Flow Value (cm/min) | Shape of Solidified Product | Water Resistance | Crushing Strength (kg/cm$^2$) | Falling Strength (%) |
| --- | --- | --- | --- | --- | --- | --- | --- |
| 3-3 | 1-1 | 23 | 46 | not changed | good | 490 | 0.8 |
| 3-4 | 1-12 | 25 | 52 | not changed | good | 480 | 1.4 |
| 3-5 | 1-20 | 26 | 57 | not changed | good | 470 | 2.2 |
| 3H-2 | 1H-6 | 28 | 5 | cracked | insufficient | 100 | — |
| 3H-3 | 1H-7 | 32 | 38 | collapsed | insufficient | 0 | — |
| 3H-4 | 1H-8 | 40 | 56 | collapsed | insufficient | 0 | — |

From the results shown in Table 9, it will readily be understood that the cement composition of the present invention is excellent over the conventional solidifying cements in the fluidity of the aqueous paste and the aqueous paste of the composition of the present invention can be cast into very small gaps among pellets packed very densely in the vessel even if the normal consistency is very small. Accordingly, in the obtained solidified product, the denseness is increased correspondingly to the reduced normal consistency, and the water resistance and strength are highly improved. Moreover, since casting is possible with a small normal consistency, the volume reduction ratio is advantageously increased.

The aqueous paste of comparative cement 3H-2 cannot be cast in the gaps among the pellets because the fluidity is insufficient. The aqueous paste of comparative cement 3H-3 or 3H-4 can be cast but the paste is not so homogeneous as the aqueous paste of the cement composition of the present invention and syneresis is caused. Furthermore, in this comparative paste, as is seen from Table 6, a long time is required for solidification, and therefore, pellets composed mainly of Glauber salt are swollen and dissolved before completion of hydration and solidification and simultaneously, the texture of the solidified product is destroyed because of expansion of the volume due to crystallization of Glauber salt.

From the foregoing, it will readily be understood that the composition of the present invention is effective for the cementing treatment of not only radioactive wastes but also other industrial wastes.

What is claimed is:

1. A hydraulic cement composition comprising (A) a water-soluble alkali metal borosilicate or a combination of a water-soluble alkali metal silicate and an alkali metal borate soluble in an alkaline aqueous solution, (B) silicon polyphosphate, (C) an alkali metal silicofluoride and (D) substantially amorphous barium silicate in which the BaO/SiO$_2$ molar ratio is in the range of from 1/2.5 to 1/6.

2. A composition as set forth in claim 1, wherein the components (B), (C) and (D) are contained in amounts as solids of 7 to 75 parts by weight, 10 to 80 parts by weight and 10 to 80 parts by weight, respectively, per 100 parts by weight as solids of the component (A).

3. A composition as set forth in claim 1 or 2, wherein the amorphous barium silicate has a suspension pH value of 9 to 13 as determined with respect to a 5% by weight aqueous suspension and has such a particle size distribution that particles having a size smaller than 10$\mu$ occupies 10 to 50% by weight of the total particles and particles having a size larger than 20$\mu$ occupy 50 to 90% by weight of the total particles.

4. A composition as set forth in claim 1, which further comprises (E) crystalline barium metasilicate.

5. A composition as set forth in claim 4, wherein the component is contained in an amount as solids of 1 to 25 parts by weight per 100 parts by weight as solids of the component (A).

6. A composition as set forth in claim 1, which further comprises (F) a high condensate of naphthalene-sulfonic acid with formaldehyde or a salt thereof.

7. A composition as set forth in claim 6, wherein the component (F) is contained in an amount as solids of 0.1 to 20 parts by weight per 100 parts by weight as solids of the component (A).

8. A composition as set forth in claim 1, which further comprises (G) synthetic or natural zeolite.

9. A composition as set forth in claim 8, wherein the component (G) is contained in an amount as solids of 1 to 25 parts by weight per 100 parts by weight as solids of the component (A).

10. A composition as set forth in claim 1 or 2, wherein the normal consistency is 15 to 30% by weight.

11. A composition as set forth in claim 1, wherein when said composition is mixed with 15 to 30% by weight of water and the resulting slurry is cast on a glass sheet having an inclination angle of 50° after the lapse of time of 30 minutes, the flow value as measured as the flow length for 1 minute is 20 to 120 cm/min.

* * * * *